United States Patent
Summers

(10) Patent No.: US 6,378,245 B1
(45) Date of Patent: Apr. 30, 2002

(54) VERSATILE TRELLIS KIT

(76) Inventor: James Lee Summers, 7700 Jaywick Ave., Ft. Wash., MD (US) 20744

( * ) Notice: Subject to any disclaimer, the term of this patent is extended or adjusted under 35 U.S.C. 154(b) by 0 days.

(21) Appl. No.: 09/711,383

(22) Filed: Nov. 14, 2000

(51) Int. Cl.$^7$ .............................. A01G 17/06; A01G 9/12
(52) U.S. Cl. ............................... 47/45; 47/70; 47/46
(58) Field of Search .................. 206/216, 223; 47/44, 45, 46, 47, 70

(56) References Cited

U.S. PATENT DOCUMENTS

| | | | | |
|---|---|---|---|---|
| 82,996 A | * | 10/1868 | Scofield | 47/47 |
| 129,385 A | * | 7/1872 | Winship | 211/198 |
| 319,057 A | * | 6/1885 | Bickley | 256/21 |
| 492,516 A | * | 2/1893 | Partridge | 47/45 |
| 542,821 A | * | 7/1895 | Broughton et al. | 47/44 |
| 950,639 A | * | 3/1910 | Petzler | 47/45 |
| 1,653,263 A | * | 12/1927 | Farrington | 47/47 |
| 1,903,122 A | * | 3/1933 | Merz et al. | 47/47 |
| 2,070,988 A | * | 2/1937 | Green | 47/44 |
| 3,391,491 A | * | 7/1968 | Daly | 47/46 |
| 3,391,492 A | * | 7/1968 | Attruia | 47/47 |
| 3,425,630 A | * | 2/1969 | Fessler | 239/208 |
| 4,301,618 A | * | 11/1981 | August | 47/46 |
| 5,341,593 A | * | 8/1994 | Foreman | 47/47 |
| 5,647,166 A | * | 7/1997 | Neff | 47/45 |
| 5,711,107 A | * | 1/1998 | Louisiana | 47/45 |
| 5,752,341 A | * | 5/1998 | Goldfarb | 47/78 |
| 6,138,407 A | * | 10/2000 | Pierce, Jr. | 47/46 |
| 6,237,282 B1 | * | 5/2001 | Pitts | 47/46 |
| 6,311,428 B1 | * | 11/2001 | Marino et al. | 47/46 |

FOREIGN PATENT DOCUMENTS

| | | | | |
|---|---|---|---|---|
| FR | 2762964 | * | 11/1998 | A01G/17/06 |
| JP | 6141706 | * | 5/1994 | A01G/17/08 |

* cited by examiner

*Primary Examiner*—Peter M. Poon
*Assistant Examiner*—Son T. Nguyen

(57) ABSTRACT

A trellis for vines and other climbing plants, for home and garden use, that will facilitate plant growth and crop harvesting. The invention has a "T" shaped support structure, with hooks for a hanging net, and ground stakes for holding the net tightly near the ground. The trellis accommodates an optional sprinkler attachment for attaching the user's own commercial sprinkler for plant watering and/or feeding. The trellis is lightweight, durable, sturdy, versatile, easy to assemble and disassemble for subsequent use, and has it own case for storage and/or shipping.

16 Claims, 9 Drawing Sheets

OPTIONAL SPRINKLER ATTACHMENT

19

TOP VIEW 19.1

SIDE VIEW 19.2

END VIEW

VERSATILE TRELLIS KIT

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO A MICROFOCHE APPENDIX

Not Applicable

BACKGROUND OF THE INVENTION

It is well known that certain plants show improved growth when they are supported off the ground. This is particularly true for certain climbing flower and vegetable plants such as climbing roses, ivy, peas, and string beans to name a few. It is also desirable to support certain plants (especially vegetables) off the ground to keep them clean and safe from certain animals and diseases.

While there are many designs that adequately support plants, many have disadvantages that reduce their usefulness in that they are complicated, cumbersome, unattractive for home use, difficult to assemble, expensive to produce, do not provide design flexibility to allow for individual creative use, are not readily collapsible into easily storable units during non-growing seasons, and some do not provide for watering and/or feeding of growing plants. Some designs use netting, but do not provide the netting cells (openings) with sufficient space to permit easy harvesting from both sides of the netting from one side. Additionally, some of those that provide for plant watering and/or feeding are configured for carrying a liquid within a complex structure while others are stand-alone devices which require their own supply of water, which would be impractical for certain situations (areas with limited space).

Known prior art trellis systems include U.S. Pat. Nos. 5,862,625; 5,647,166; U.S. Pat. No. D370,536; U.S. Pat. No. 5,357,710; U.S. Pat. No. D287,284; U.S. Pat. Nos. 4,432,190; 4,418,521; and 4,306,618.

In view of the foregoing disadvantages inherent in the known types of trellis systems in the prior art, the present invention provides a plant support system that is easily assembled and disassembled, attractively designed, inexpensive to manufacture, readily collapsible for storage in its own storing case, accommodates a sprinkler for plant watering and/or feeding, allows for individual creative use, and is suitable for a mail-order business. Other objectives and advantages will be addressed in the balance of the specifications.

The novel features that also characterize this invention are pointed out with particularity in the claims section of this submission. For a better understanding of the invention, its operational advantages and the specific features, reference should be made a to the accompanying drawings and descriptive matter referred to in the detailed description of the invention.

BRIEF DESCRIPTION OF SEVERAL VIEWS OF THE DRAWINGS

The invention will be readily understood and features other than those set forth above will become apparent when consideration is given to the brief description and the following detailed description thereof. Such descriptions make reference to the annexed drawings herein.

DETAILED DESCRIPTION OF THE INVENTION

Figure 1:
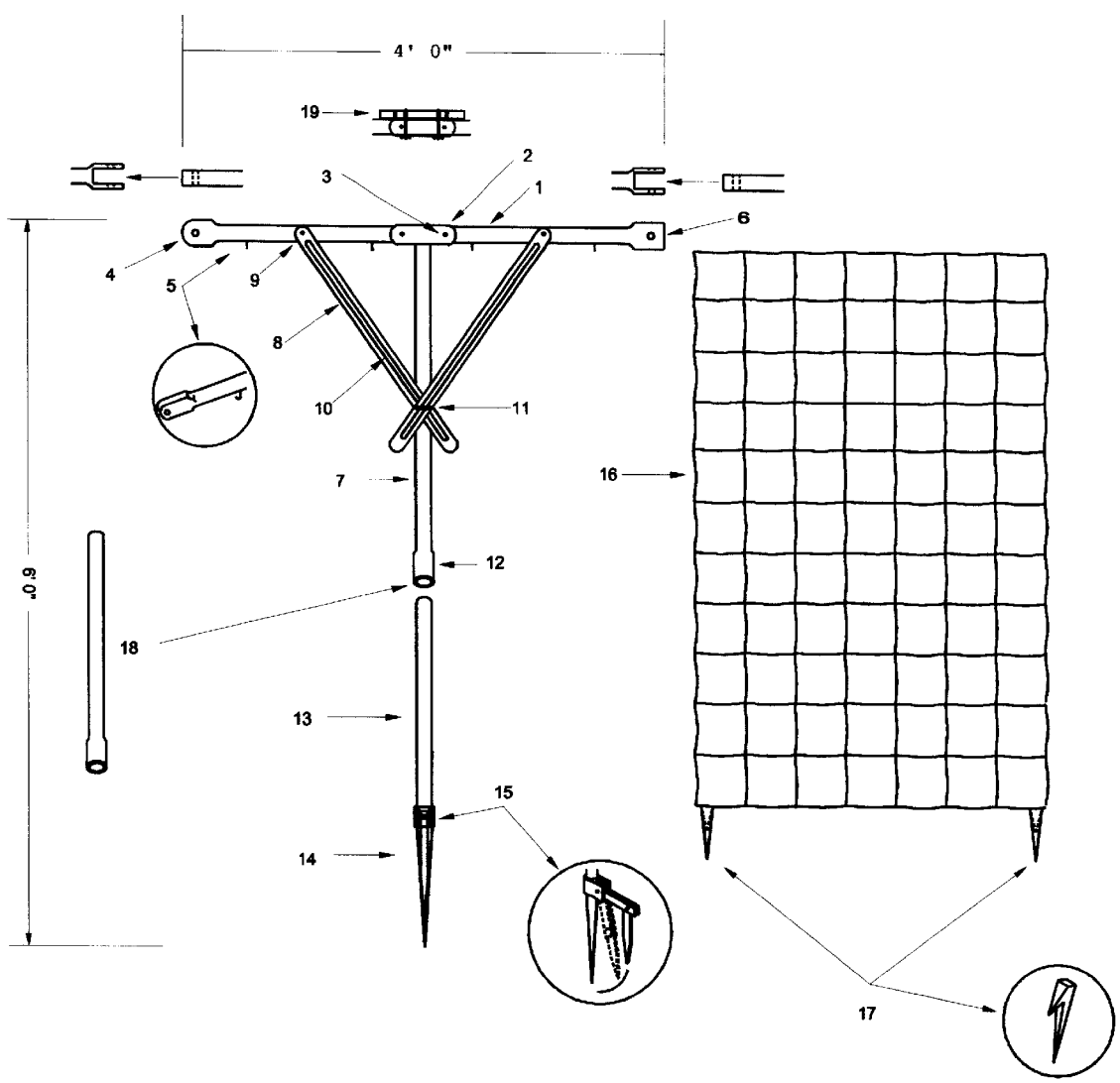
FIG. 1 is a view of the component parts, such as, the structural support, sleeved stabilizer, netting, netting stakes, optional vertical extension, sprinkler attachment, and their general relationship to each other.
Figure 2:
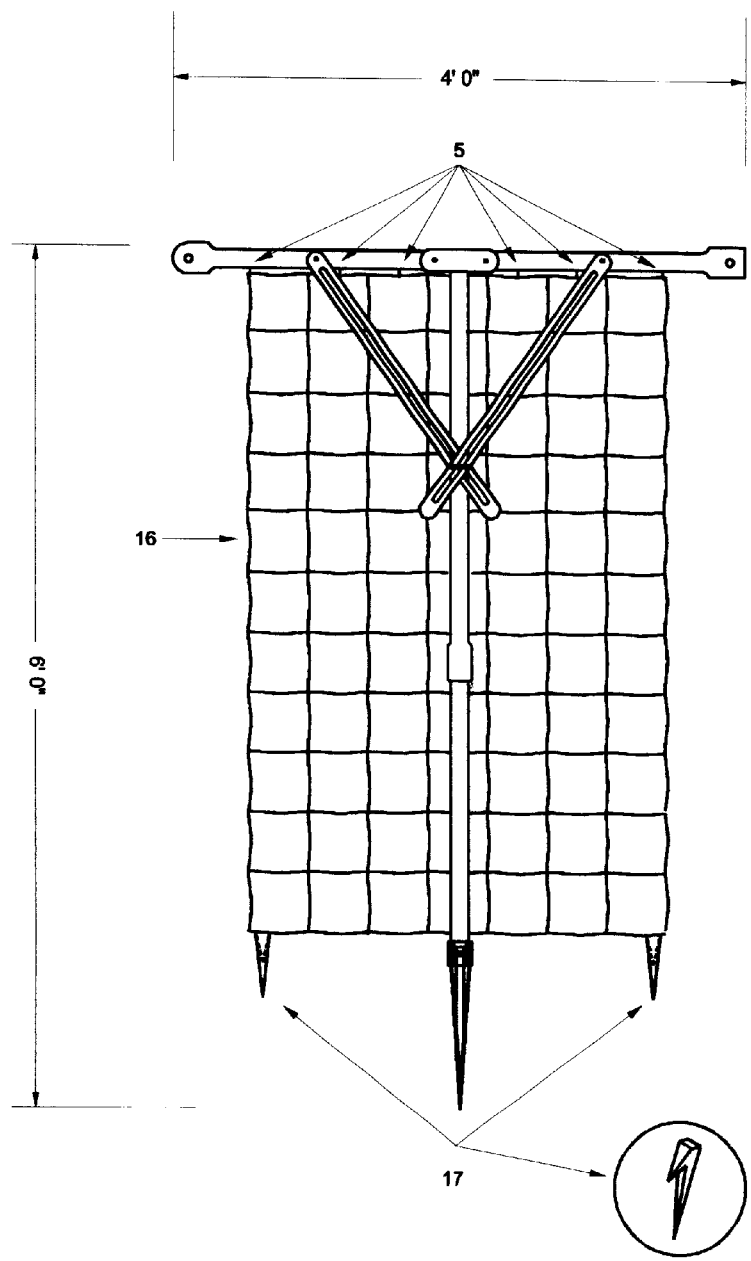
FIG. 2 is a view of a single support structure assembled with accompanying netting and ground stakes.
Figure 3:
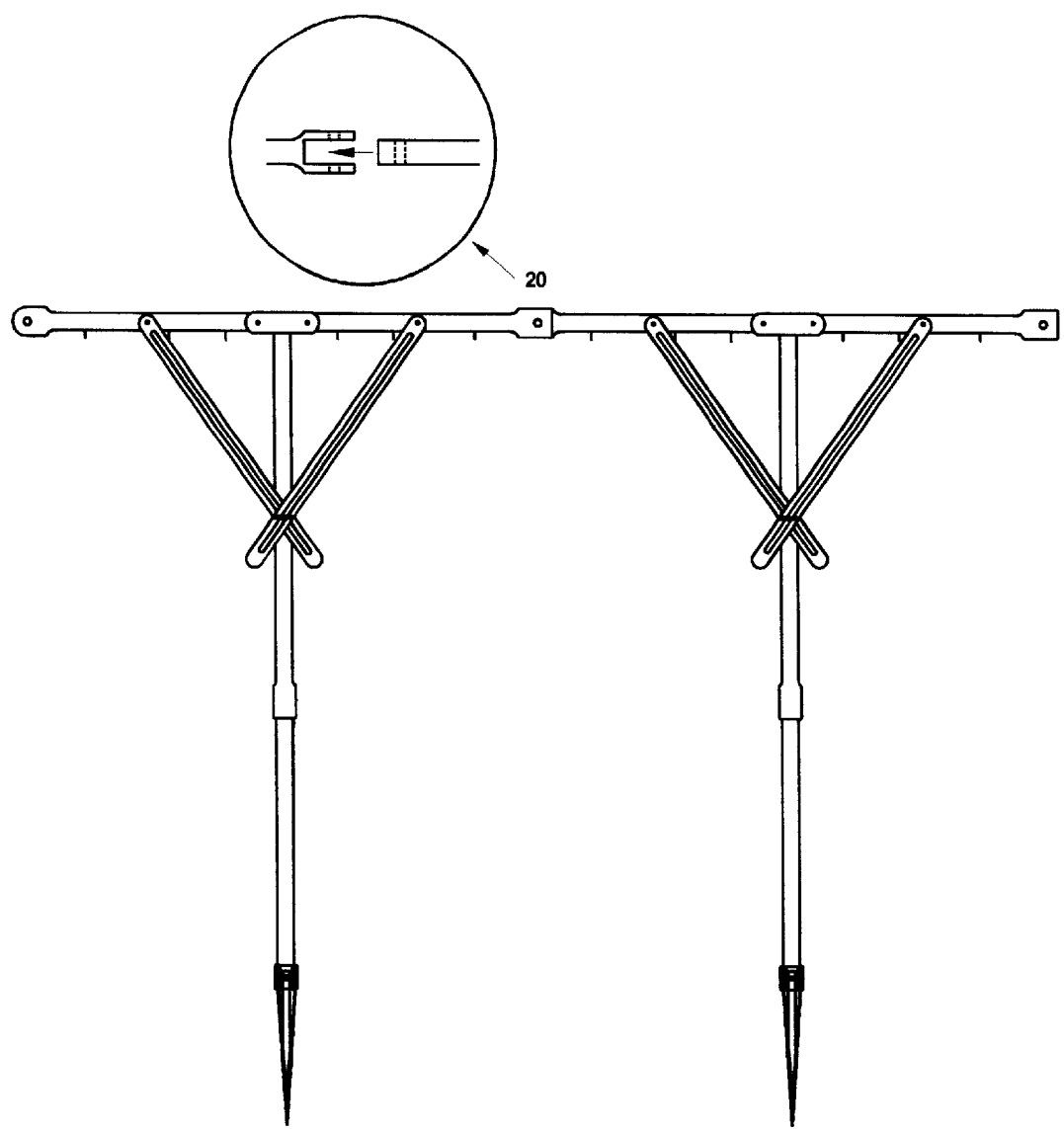
FIG. 3 is an enlargement of the connection (20) of two trellises.
Figure 4:
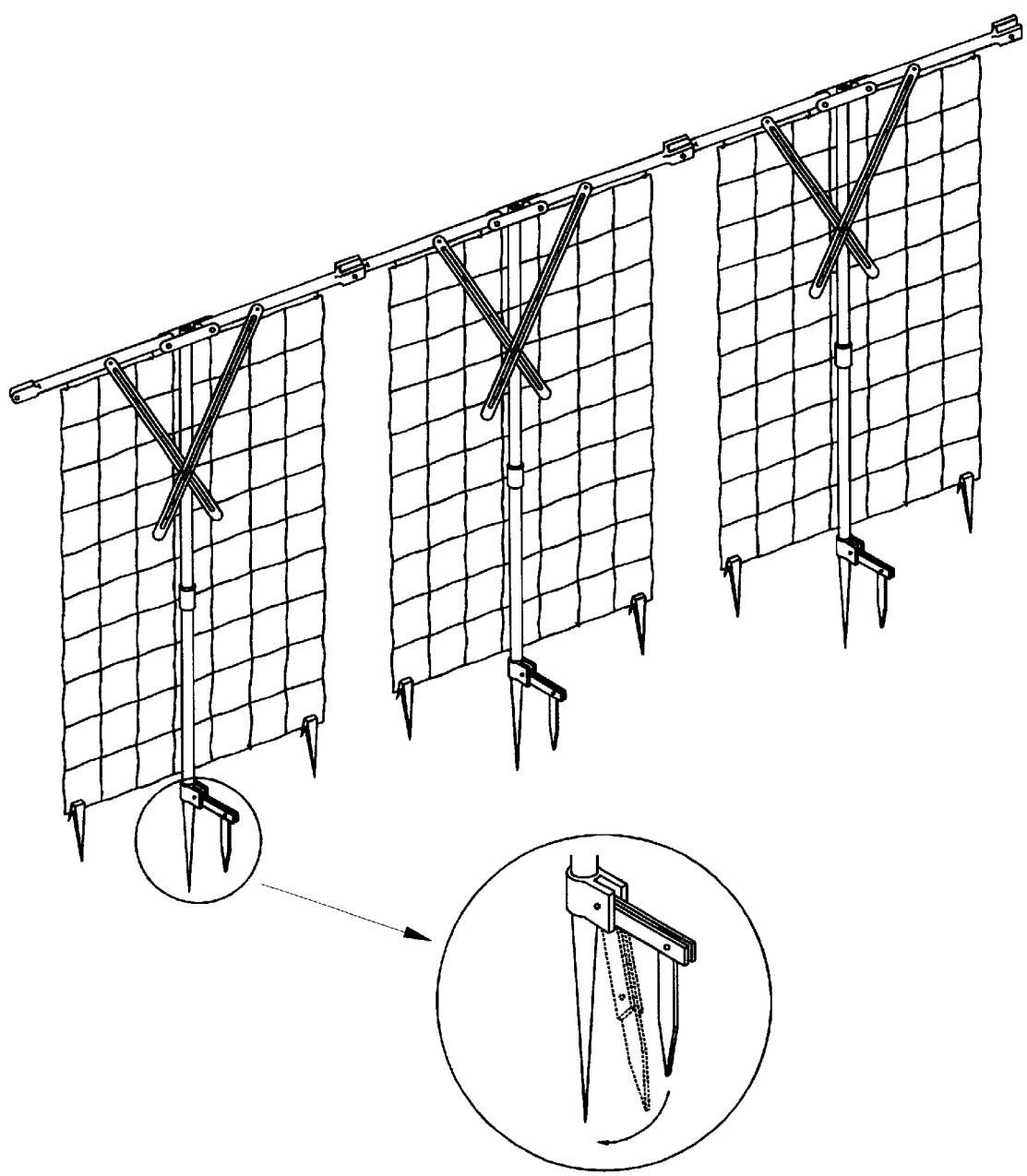
FIG. 4 illustrates several trellises connected in a row as would be seen in a field.
Figure 5:
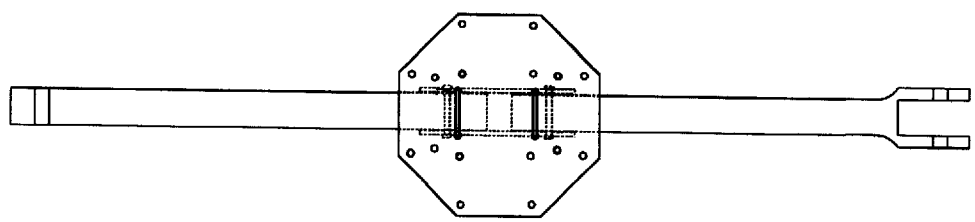
FIG. 5 is a top view of the horizontal arm of a single trellis with optional sprinkler attachment. The side view (19.1) and end view (19.2) show optional sprinkler attachment with a commercial sprinkler (commercial sprinkler is not a part of this invention).
Figure 5:
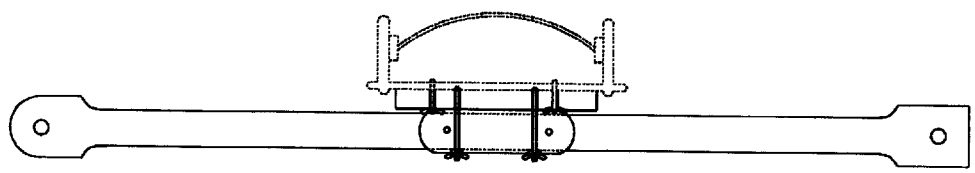
Figure 5:
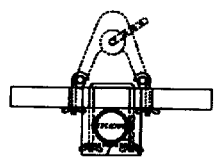
Figure 6:
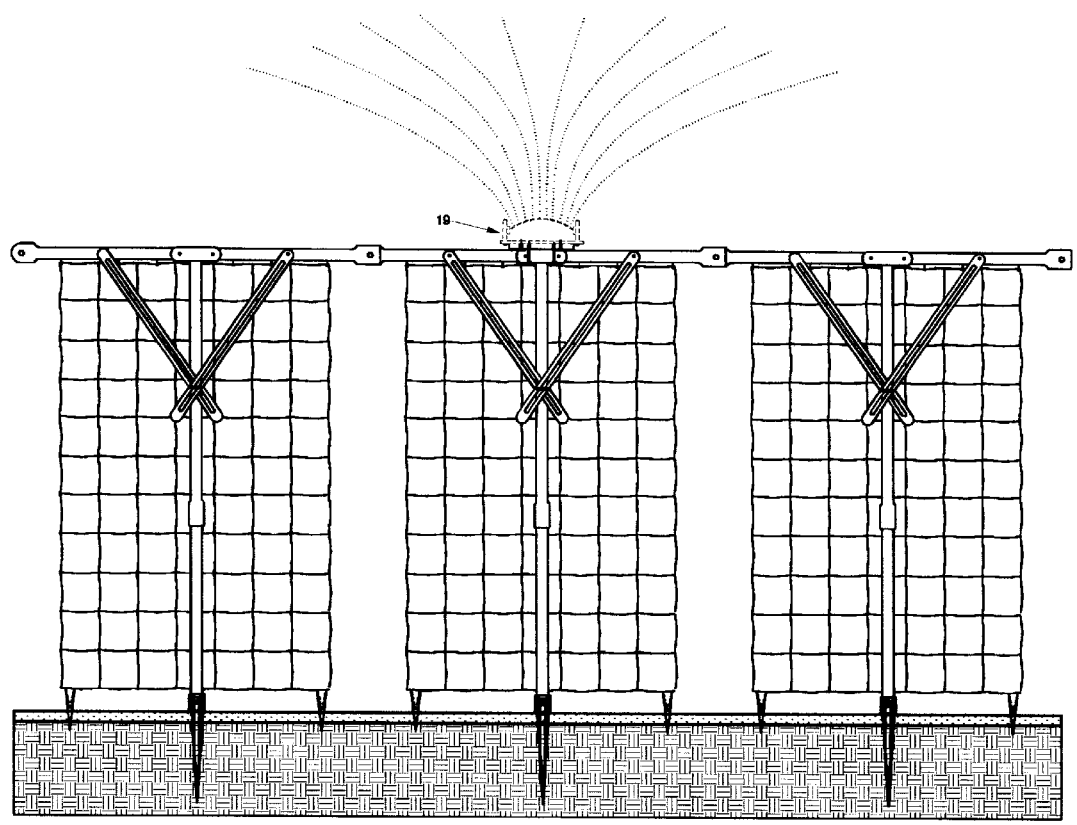
FIG. 6 is an illustration of several trellises with an optional sprinkler attachment and commercial sprinkler (the sprinkler is not a part of this invention).
Figure 7:
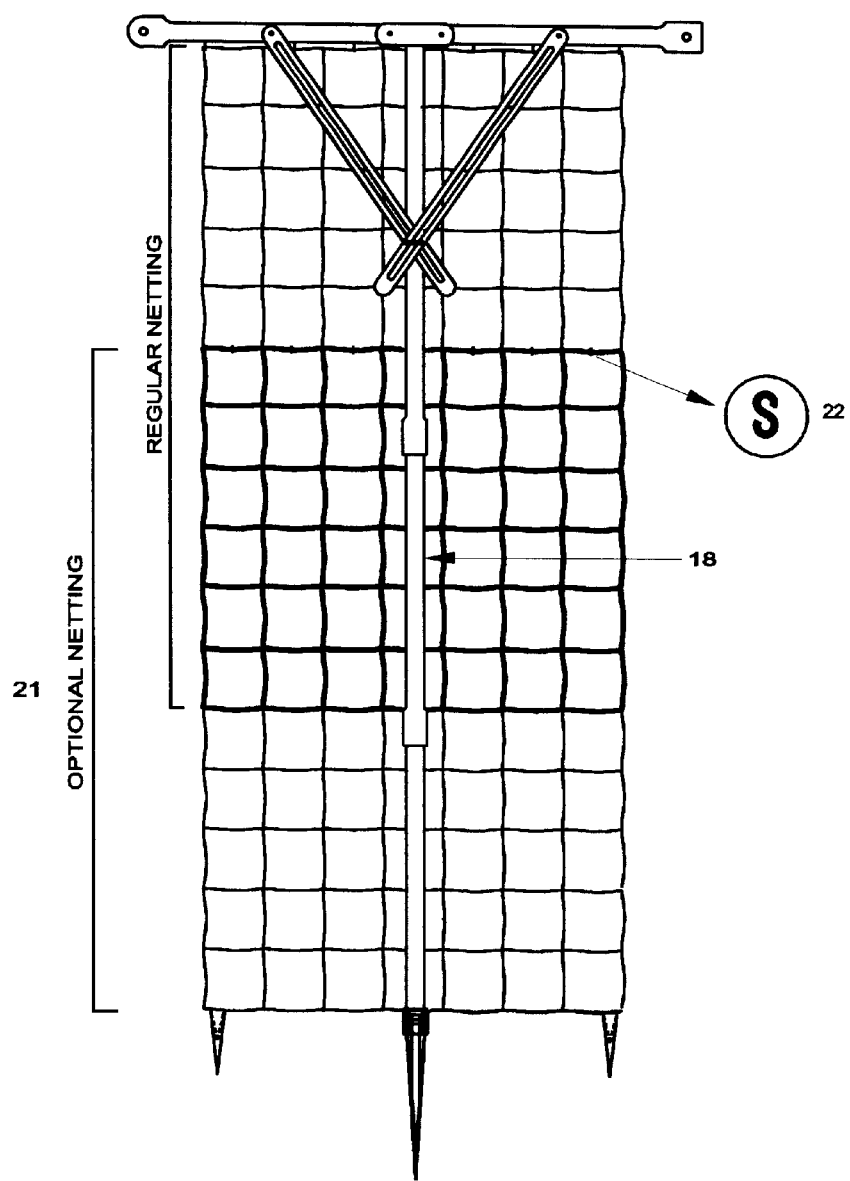
FIG. 7 depicts the trellis with an optional extension of the vertical support structure and optional netting held in place with "S" hooks (22).
Figure 8:
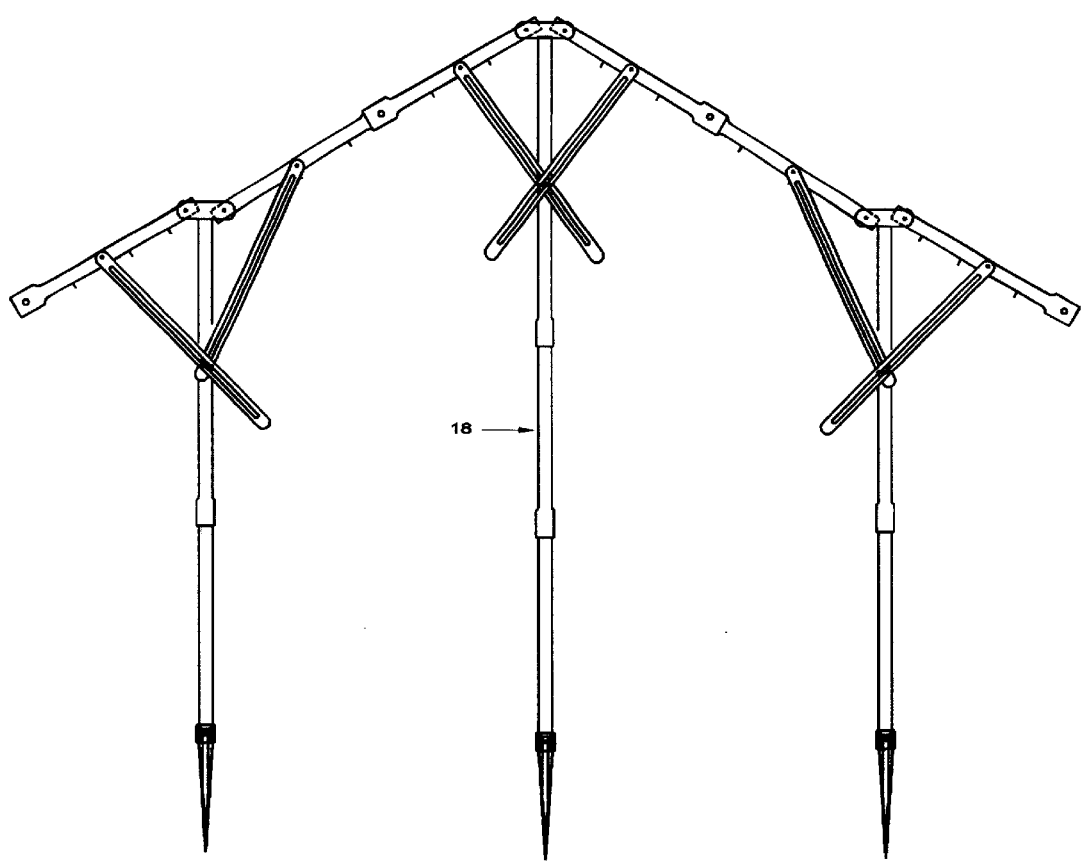
FIG. 8 illustrates a support structure showing optional positions of the horizontal arms and an optional vertical support extension.
Figure 9:
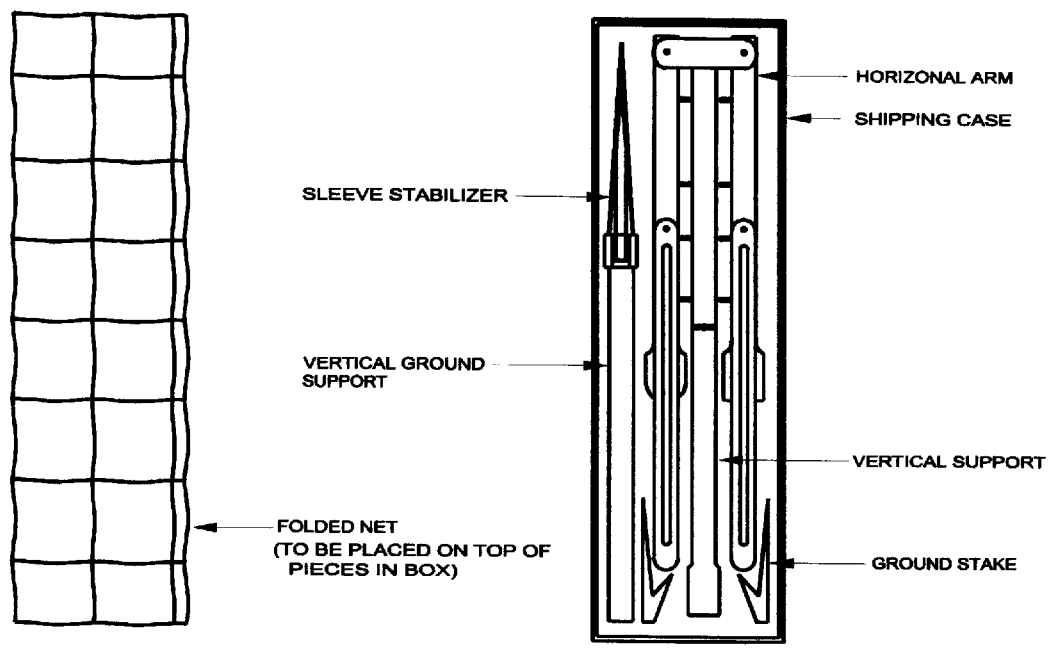
FIG. 9 shows the storage case for the trellis during off-growing seasons and/or for shipping the same.

With reference now to the drawings in more detail, it can be seen that there is illustrated in FIG. 1 a support structure consisting of a horizontal arm (1) with hooks (5), formed by two pieces of tubing attached to each end of the horizontal arm spacer (2) with two permanent pins (3) to allow the arm to fold. One end of the horizontal arm is flattened (4) and the other end is flared (6) to allow the connection with an adjoining trellis. A vertical support (7) permanently attached to the horizontal arm spacer (2) receives two braces (8) that are permanently attached to each side of the horizontal arm with permanent pins (9). These braces with knotched slits (10) are attached to the vertical support (7) by a bolt with wing nut (11). The vertical support cupped end (12) receives the capped end of the vertical ground support (13) whose tapered bottom end (14) is for penetrating the ground. The vertical ground support bears a sleeved stabilizer (15) to penetrate the ground and helps to anchor the support system. A lattice netting (16) with 5×5 inch cells to permit crop harvesting on both sides of the trellis. Two net stakes (17) for tightening the net and aid in anchoring the trellis. In addition, there is an optional 2 feet vertical extension (18) to permit extending the height of the trellis. Optional sprinkler attachment (19) is also provided for securing a commercial sprinkler to the trellis for watering and feeding plants. FIG. 2 in more detail, shows the structural support system of a single assembled trellis with netting (16) on hooks (5), netting stakes (17) for tightening the net, and a sleeve stabilizer for anchoring the trellis, as would be seen on the lawn or in a garden. FIGS. 3 through 6 illustrate the connection of the horizontal arms of two trellises (20), trellises connected in a row as would be seen in a garden, the horizontal arm of a trellis with an optional sprinkler attachment (19) and a commercial sprinkler (19.1 and 19.2 not included as part of this invention), and trellises in a row with a sprinkler as would be used for watering and feeding plants, respectively. FIG. 7 illustrates a trellis with an optional vertical support extension and optional netting attached to the regular netting provided with the kit by "S" hooks (22). FIG. 8 illustrates an optional position of three trellises connected with the center trellis using an optional vertical support to create a different configuration to suit an individual need. FIG. 9 depicts a trellis kit dissasembled as it would be placed in its own storage container with the netting for off-season storing and/or for shipping.

While the invention has been described with reference to certain specific features for purposes of example, many variations are possible and it is not intended to limit the invention except as defined by the following claims.

The trellis preferably has a lightweight support structure consisting of lightweight aluminum tubing or other durable lightweight material, that is resistant to corrosion. Using hollow tubes as support arms has the advantages of making the trellis less top heavy and therefore more stable and less likely to fall over, less heavy and therefore easier to transport, and less expensive to manufacture. The netting is preferably made of a flexible ultraviolet light resistant material, such as polyethylene or nylon, with or without a coating. The support structure has the design flexibility to allow for individual creative use by repositioning the horizontal arms and/or using the vertical extensions for a variety of designs.

What is claimed is:

1. A trellis kit, comprising:
   a first hollow tube and a second hollow tube, the first and second hollow tubes each having a first end, a second end opposite the first end, and hooks between the first end and the second end, the first hollow tube having a flared second end, and the second hollow tube having a flattened second end that fits inside the flared second end of the first hollow tube, whereby a plurality of trellises can be joined together in a row;
   a spacer with a first end and a second end, with the first end of the first hollow tube pivotally attached to the first end of the spacer, and the first end of the second hollow tube pivotally attached to the second end of the spacer, whereby the hollow tubes can be positioned in a variety of angles;
   vertical support having an upper end to which the spacer is attached, and a lower end that is cupped;
   ground support having an upper end that fits into the cupped lower end of the vertical support, and a lower end that is tapered;
   a first brace that is attached to the first hollow tube and can be attached to the vertical support, and a second brace that is attached to the second hollow tube and can be attached to the vertical support; and
   a flexible netting, that is hung from the hooks on the hollow tubes.

2. The trellis kit according to claim 1, wherein the flexible netting has openings that are at least five inches in height and at least five inches in width.

3. A trellis kit according to claim 2, further comprising:
   an anchoring device attached to the lower end of the ground support, whereby the ground support can be stabilized after its lower end has penetrated the ground.

4. A trellis kit according to claim 3, wherein the anchoring device is a sleeve stabilizer.

5. A trellis kit according to claim 4, further comprising:
   stakes, whereby the netting may be held taunt near the ground.

6. A trellis kit according to claim 5, further comprising:
   a container, whereby the trellis kit may be stored and shipped.

7. A trellis kit according to claim 6, further comprising:
   bolts and wing nuts for attaching the braces to the hollow tubes and the vertical support.

8. A trellis kit according to claim 7, wherein the first ends of the first and second hollow tubes are rounded.

9. A trellis kit according to claim 8, further comprising:
   an attachment that can retain a sprinkler.

10. A trellis kit according to claim 9, wherein the hollow tubes, the spacer, the vertical support and the ground support are made of a lightweight material that is resistant to corrosion.

11. A trellis kit according to claim 10, wherein said lightweight material is aluminum tubing.

12. A trellis kit according to claim 11, wherein the netting is made of a material resistant to ultraviolet light.

13. A trellis kit according to claim 12, wherein the netting is made of coated polyethylene.

14. A trellis kit according to claim 12, wherein the netting is made of uncoated polyethylene.

15. A trellis kit according to claim 12, wherein the netting is made of coated nylon.

16. A trellis kit according to claim 12, wherein the netting is made of uncoated nylon.

* * * * *